3,326,955
PREPARATION OF AMINE COMPLEXES OF ALUMINUM HYDRIDE
Gottfried J. Brendel and Paul Kobetz, Baton Rouge, La., and Thomas P. Whaley, Glenview, Ill., assignors to Ethyl Corporation, New York, N.Y., a corporation of Virginia
No Drawing. Filed Sept. 23, 1963, Ser. No. 310,849
14 Claims. (Cl. 260—448)

This invention relates to a process for the synthesis of tertiary amine complexes of aluminum hydride, for example the trimethylamine complex of aluminum hydride, the bis-trimethylamine complex of aluminum hydride, and the like.

Tertiary amine complexes of aluminum hydride are well known, their composition, properties, and methods of preparation being disclosed in the literature. One method reported by Wiberg, Graf, and Uson, in their publication entitled "About Monomeric Aluminum Hydride, $AlH_3$," Z. anorg. allgem. Chem. 272, 221–32 (1953) comprises reacting $AlH_3$ with a trialkylamine. Another method disclosed in U.S. 2,680,059 consists of reacting a tertiary amine with aluminum hydride in diethylether. Yet another method as reported by Ruff and Hawthorne, J. Am. Chem. Soc., 82, 2141 (1960) comprises reacting lithium aluminum hydride with trimethylamine hydrochloride in diethylether to produce the corresponding trimethylamine complex of aluminum hydride.

It can be seen that the above processes are in effect two stage processes inasmuch as they require either aluminum hydride or a double hydride thereof (e.g. $LiAlH_4$) as a reactant. These hydrides are expensive and therefore subtract from the commercial atractiveness of these processes. Hence, a process employing inexpensive reactants whereby tertiary amine complexes of aluminum hydride can be produced by direct synthesis, that is in a single step, would represent a significant contribution to the art.

An object of this invention is to prepare tertiary amine complexes of aluminum hydride by a process utilizing relatively inexpensive raw materials whereby tertiary amine complexes of aluminum hydride are produced in high yields. Another object of this invention is to produce tertiary amine complexes of aluminum hydride by a one step process directly from such inexpensive raw materials. These and further objects will come to light as the discussion proceeds.

In accordance with this invention, tertiary amine complexes of aluminum hydride are produced in high yield by a process comprising effecting reaction under essentially anhydrous conditions among an alkali metal hydride, an aluminum trihalide, and a trialkylamine in a liquid hydrocarbon diluent and in the presence of an alkylaluminum catalyst.

Alkali metal hydrides that can be employed in the present process are lithium hydride, sodium hydride, potassium hydride, rubidium hydride, and the like. Of the alkali metal hydrides, sodium hydride is most preferred since it is readily available at low cost.

Aluminum trihalides suitable for use in the instant process are for example aluminum trifluoride, aluminum trichloride, aluminum tribromide, aluminum triiodide, all in their anhydrous forms. Aluminum trichloride is especially preferred since it is a staple article of commerce and hence offers a cost advantage.

The trialkylamine reactant preferably contains alkyl groups having less than about 12 carbon atoms each. Of these, the most preferred are the lower alkylamines, that is, those having alkyl groups containing from 1 to 6 carbon atoms each, particularly where the alkyl groups are the same, trimethylamine being the most preferred tertiary amine for the use in the process of this invention. The aluminum hydride complexes of these lower alkylamines have a degree of volatility which render them extremely suitable for vapor phase plating operations whereby pure aluminum coatings are realized in a very expeditious manner. Typical trialkylamines that can be employed in the instant invention are: trimethylamine, triethylamine, tripropylamine, triisopropylamine, tributylamine, triisobutylamine, tridecylamine, tridodecylamine, methyldiethylamine, methylbutylamine, and the like.

The hydrocarbon diluent employed pursuant to the practice of this invention is one that is liquid under the process conditions as well as being inert to the reactants and the end product tertiary amine complex of aluminum hydride. Preferred hydrocarbon diluents are the paraffins, cycloparaffins, and aromatics, especially mononuclear aromatics. Exemplary of suitable diluents are: pentane, hexane, 2,2-dimethylbutane, decane, cyclopentane, cyclohexane, benzene, toluene, o-xylene, and the like. The hydrocarbon diluent is preferably one wherein the end product trialkylamine complex of aluminum hydride is readily soluble therein and the by-product is not since this provides an efficacious manner by which they can be separated. For this reason, the alkanes and especially the aromatics, notably mononuclear aromatics, are preferred since the solubility of the end product trialkylamine complex of aluminum hydride is in general very good in these diluents. When operating under preferred operating conditions as hereinafter defined, the diluent is preferably one having a boiling point of at least about 70° C.

The alkylaluminum catalyst is preferably a lower alkylaluminum compound, that is, those having alkyl groups having from 1 to 6 carbon atoms each, especially those compounds wherein each alkyl group is the same. Exemplary of suitable catalysts are: trimethylaluminum, triethylaluminum, triisobutylaluminum, trihexylaluminum, methyldiethylaluminum, and the like. However, alkylaluminum substituted compounds, such as diethylaluminum hydride or the like, can also be used. The most preferred catalyst is triethylaluminum since it is widely produced and hence readily available.

Thus it can be seen that a particularly preferred embodiment of the instant process comprises effecting reaction under essentially anhydrous conditions among sodium hydride, aluminum trichloride, and trimethylamine in a liquid hydrocarbon diluent in the presence of triethylaluminum as a catalyst whereby either (or both) of the corresponding trimethylamine complexes of aluminum hydride is produced in good yield.

Among the advantages and features of the present invention is that the raw materials employed are relatively expensive. Alkali metal hydrides, especially lithium hydride, sodium hydride, and potassium hydride are very easily prepared at low cost, for example, by the efficacious method as disclosed in U.S. Patent 1,958,012. Moreover, the aluminum trihalides, especially aluminum trichloride are readily available and are less expensive and more easily handled than either aluminum hydride or the alkali metal aluminum hydride required as raw materials in the prior art procedures referred to above. The use of a hydrocarbon diluent and an alkylaluminum catalyst are key features of the present invention inasmuch as it has been found that the present process is erratic and uncontrollable in their absence. As will be seen in the comparative examples presented hereinafter, when attempts were made to conduct this reaction in the absence of a hydrocarbon diluent and an alkylaluminum catalyst, either no reaction occurred, or at times a retarded reaction occurred resulting at most in a yield of only 12 percent. In other instances a very vigorous uncontrolled exothermic reaction occurred whereby simultaneous rapid decomposition of the end product amine complex of aluminum hydride was experienced. A still further advantage is that the use of a hydrocarbon diluent wherein the end product is soluble provides for its automatic separation from the reaction by-product (e.g. NaCl). The hydrocarbon diluent also suppresses side reactions. Furthermore, yields of the desired product over 75 percent have been realized. Therefore it can be seen that the present process is a commercially practical process characterized by its simplicity whereby in one step trialkylamine complexes of aluminum hydride can be readily produced in commercially satisfactory yields.

The following examples are presented wherein all parts are by weight unless otherwise specified.

EXAMPLE I

The following runs were conducted on a batch basis. The equipment comprised a reaction vessel equipped with means for charging the reactants to the vessel under an inert atmosphere. The vessel further comprised agitation means and means for discharging the total reaction system.

The reaction vessel was first purged with nitrogen and partially filled with benzene. Sodium hydride and triethylaluminum catalyst were then added to the reactor and the mixture agitated to produce a slurry. To this slurry was then added a benzene solution containing aluminum chloride and trimethylamine.

The reaction was noted to start immediately and within a few minutes the temperature had risen to about 40° C. and more slowly up to about 50° C. During the course of the reaction the formation of finely divided solids increased very steadily. Termination of the reaction was noted by a sharp and rapid temperature drop. The times of the runs presented below varied between about 45 to about 100 minutes. After the reaction was complete, the reaction mixture was then stirred for an additional 30 minutes and heat applied to insure completion. The reaction mixture was then filtered and the retained solids washed with benzene. The end product, which was the trimethylamine complex of aluminum hydride, was recovered in crystalline form by stripping off the benzene. Further details of individual runs conducted as above are presented below.

| Run Number | 1 | 2 | 3 | 4 | 5 |
|---|---|---|---|---|---|
| Parts of NaH | 82 | 55 | 60 | 120 | 55 |
| Parts of AlCl$_3$ | 100 | 100 | 100 | 100 | 100 |
| Parts of NMe$_3$ | 44 | 44 | 44 | 44 | 44 |
| AlEt$_3$ Concentration | 4 | 8 | 8 | 9 | 13 |
| Yield based on AlCl$_3$ | 49 | 67 | 57 | 31 | 75 |

When triisobutylaluminum was employed as a catalyst in the above reaction, similar results were obtained.

When lithium hydride or potassium hydride is substituted for sodium hydride in the above procedure, trimethylamine complex of aluminum hydride is produced in good yield.

EXAMPLE II

Employing the same equipment and procedure of Example I above, sodium hydride when reacted with aluminum tribromide and triisobutylamine in hexane as the diluent in the presence of tripropylaluminum as a catalyst produces the corresponding triisobutylamine complex of aluminum hydride.

The substitution of triethylamine, tripropylamine, and trihexylamine in the above procedure produces the corresponding complexes of aluminum hydride.

That it is necessary to employ an alkylaluminum compound as a catalyst in the process of this invention in order to make the process commercially satisfactory is demonstrated by the following comparative example.

Comparative Example

In one run, the same equipment and procedure as in Example I were employed in the absence of a catalyst. No reaction was found to occur.

In another run in the absence of a catalyst, the trimethylamine was slowly added to a slurry of sodium hydride and aluminum trichloride in benzene. Only a 12 percent yield of the trimethylamine complex of aluminum hydride was obtained, 70 percent of the aluminum trichloride having complexed with the trimethylamine.

When the same procedure of the preceding run was again followed, a very vigorous uncontrollable exothermic reaction occurred with the simultaneous evolution of gas which was due to the rapid decomposition of the resultant end product.

Thus it can be seen from the above comparative example that in the process of this invention the alkali metal hydride, aluminum trihalide, and trialkylamine must be reacted in a liquid hydrocarbon diluent in the presence of an alkylaluminum compound as a catalyst in order to achieve the objectives of this invention, viz. a simple one step process whereby trialkylamine complexes of aluminum hydride are realized in satisfactory commercial yields.

As brought out above, the present process is conducted under anhydrous conditions to avoid excessive hydrolysis of the alkali metal hydride reactant and of the end product trialkylamine complex of aluminum hydride. However, slight traces of moisture can be tolerated such as that normally present in commerically pure materials. For this reason, it is preferred to employ an excess of the alkali metal hydride reactant since it will eliminate any small amount of moisture being introduced into the system.

The maximum temperature at which the present process is conducted is mainly governed by the decomposition temperature of the end product trialkylamine complex of aluminum hydride. Generally, temperatures anywhere from about 0° C. to about 100° C. are suitable. When utilizing the preferred reactants discussed above, it is preferred to operate at a temperature of from about 10° C. to about 70° C. The present process being exothermic, the most attractive manner in which to conduct this process is to charge the catalyst and reactants into the hydrocarbon diluent which is initially at room tempertaure (25–30° C.). The heat evolved will raise the temperature of the reaction system and the reaction can be allowed to proceed on its own accord inasmuch as sufficient diluent may be used as a heat sink and keep the temperature within the ranges described above. However, cooling means may be employed if desired. Upon substantial completion of the reaction as evidenced by cessation of heat evolution, heat can be applied to the reaction mass to insure full utilization of the raw materials. However, the reaction mass should not be heated to the decomposition temperature of the desired product.

The pressure at which the instant process is conducted is not a limiting factor, generally pressures anywhere from about 0 p.s.i.g. to about 600 p.s.i.g. are suitable. An economical feature of this process is that it can be conducted at low pressures, for example on the magnitude of from about 0 p.s.i.g. to about 50 p.s.i.g. (especially at essentially atmospheric pressure) within which range it is preferred to operate since such pressures are the easiest to achieve and are most economical. The operating pressure to be employed is largely dictated by the boiling point of the particular hydrocarbon diluent utilized which must be maintained essentially in its liquid state during the reaction in order to serve its intended purpose. At any pressure, the process is conducted under an inert atmosphere or blanket to avoid oxidation of the reactants and the end product trialkylamine complex of aluminum hydride. Suitable inert gas media for this purpose are: nitrogen, hydrogen, gaseous aliphatic hydrocarbons, neon, argon, krypton, and the like. In some instances (e.g. where the volatilities of each of the members of the reaction system are sufficiently low) the present process may be conducted under vacuum conditions.

When conducting the process of this invention it is preferred to have an excess of the alkali metal hydride present to eliminate any moisture present in the system and, moreover, to insure complete reaction of the aluminum trihalide reactant. For these reasons, it is preferred to employ from about 3.1 up to about 5 moles of the alkali metal hydride per mole of the aluminum trihalide.

The composition of the end product, that is, whether it be a mono-amine complex of aluminum hydride or a bis-amine complex of aluminum hydride is mainly a function of the amount of amine present during the course of the reaction. Thus, where it is preferred to produce predominantly a mono-amine complex of aluminum hydride the molar ratio of the trialkylamine to that of the aluminum trihalide is preferably maintained at about 1:1. By the same token, where the bis-amine complex of aluminum hydride is desired the molar ratio of the trialkylamine to the trihalide is preferably about 2:1 or higher.

The concentration of the catalyst is preferably within the range of from about 1 to about 15 mole percent based upon the aluminum trichloride, especially from about 5 to about 10 mole percent.

As can be seen from the above working examples, the reaction proceeds very rapidly. The reaction being exothermic, termination is noted by a resultant temperature drop. The process of this invention can be conducted on a continuous, semi-continuous, or batch basis. Generally, residence times of from about a few minutes to about 1 hour are suitable for the realization of high yields.

Preferred compounds produced by way of this invention are the trimethylamine and bis-trimethylamine complexes of aluminum hydride as well as mixtures thereof since these compounds have a distinct utility in the art of metal plating. In vapor phase metal plating operations these compounds are excellent aluminum plating agents whereby exceptionally pure aluminum coatings are easily realized, for example, see British Patent 915,385.

The compounds prepared by way of the novel process of this invention are also useful as reducing agents and for the preparation of other metal hydrides, as well as mixed metal hydrides.

We claim:

1. A process for the preparation of trialkylamine complexes of aluminum hydride comprising effecting reaction under essentially anhydrous conditions among an alkali metal hydride, an aluminum trihalide, and a trialkylamine in a liquid hydrocarbon diluent and in the presence of a catalytic amount of alkylaluminum compound.

2. The process of claim 1 further characterized in that said alkali metal hydride is sodium hydride.

3. The process of claim 1 further characterized in that said aluminum trihalide is aluminum trichloride.

4. The process of claim 1 further characterized in that said trialkylamine is one wherein the alkyl groups are the same and contain from one to six carbon atoms each.

5. The process of claim 1 further characterized in that said trialkylamine is trimethylamine.

6. The process of claim 1 further characterized in that said hydrocarbon diluent is a mononuclear aromatic hydrocarbon.

7. The process of claim 1 further characterized in that said hydrocarbon diluent in benzene.

8. The process of claim 1 further characterized in that said alkylaluminum catalyst is a trialkylaluminum compound having alkyl groups containing from one to six carbon atoms each.

9. The process of claim 1 further characterized in that said alkylaluminum catalyst is triethylaluminum.

10. A process for the preparation of a trimethylamine complex of aluminum hydride comprising effecting reaction under essentially anhydrous conditions among sodium hydride, aluminum trichloride, and trimethylamine in a liquid mononuclear aromatic hydrocarbon diluent and in the presence of a catalytic amount of an alkylaluminum compound.

11. The process of claim 10 further characterized in that said process is conducted at a temperature within the range of from about 0° C. to about 100° C.

12. The process of claim 10 further characterized in that said process is conducted at a pressure within the range of from about 0 p.s.i.g. to about 600 p.s.i.g.

13. The process of claim 10 further characterized in that said reaction is conducted under an inert atmosphere.

14. A process for the preparation of trialkylamine complexes of aluminum hydride comprising effecting reaction under essentially anhydrous conditions among an alkali metal hydride, an aluminum trihalide, and a trialkylamine selected from the group consisting of trialkylamines wherein each alkyl group is the same and contains from 1 to 6 carbon atoms, in a liquid hydrocarbon diluent and in the presence of a catalytic amount of an alkylaluminum compound; said reaction being conducted at a temperature within a range of from about 0° C. to about 100° C. and at essentially atmospheric pressure under an inert blanket.

No references cited.

TOBIAS E. LEVOW, *Primary Examiner.*

H. M. SNEED, *Assistant Examiner.*